May 28, 1929. P. J. BREITENBACH ET AL 1,715,187
APPARATUS FOR SUSPENDING SKINS, HIDES, AND THE LIKE
Filed July 28, 1926   6 Sheets-Sheet 3
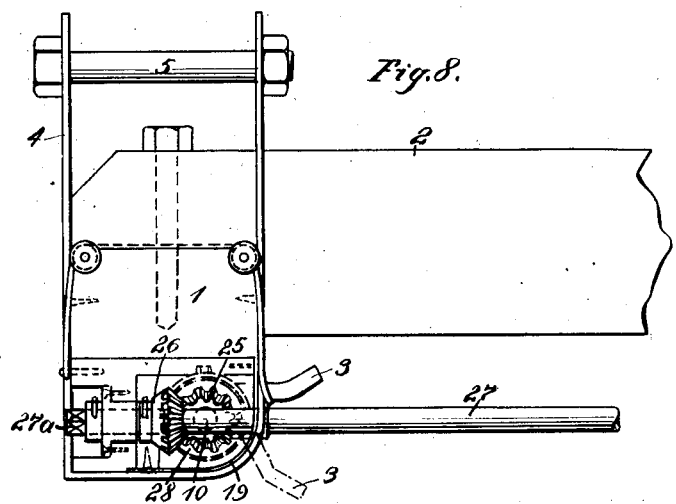
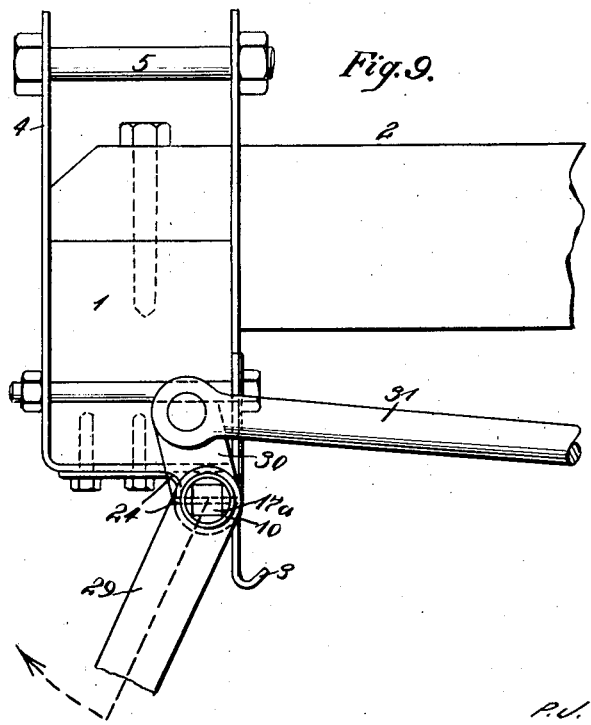

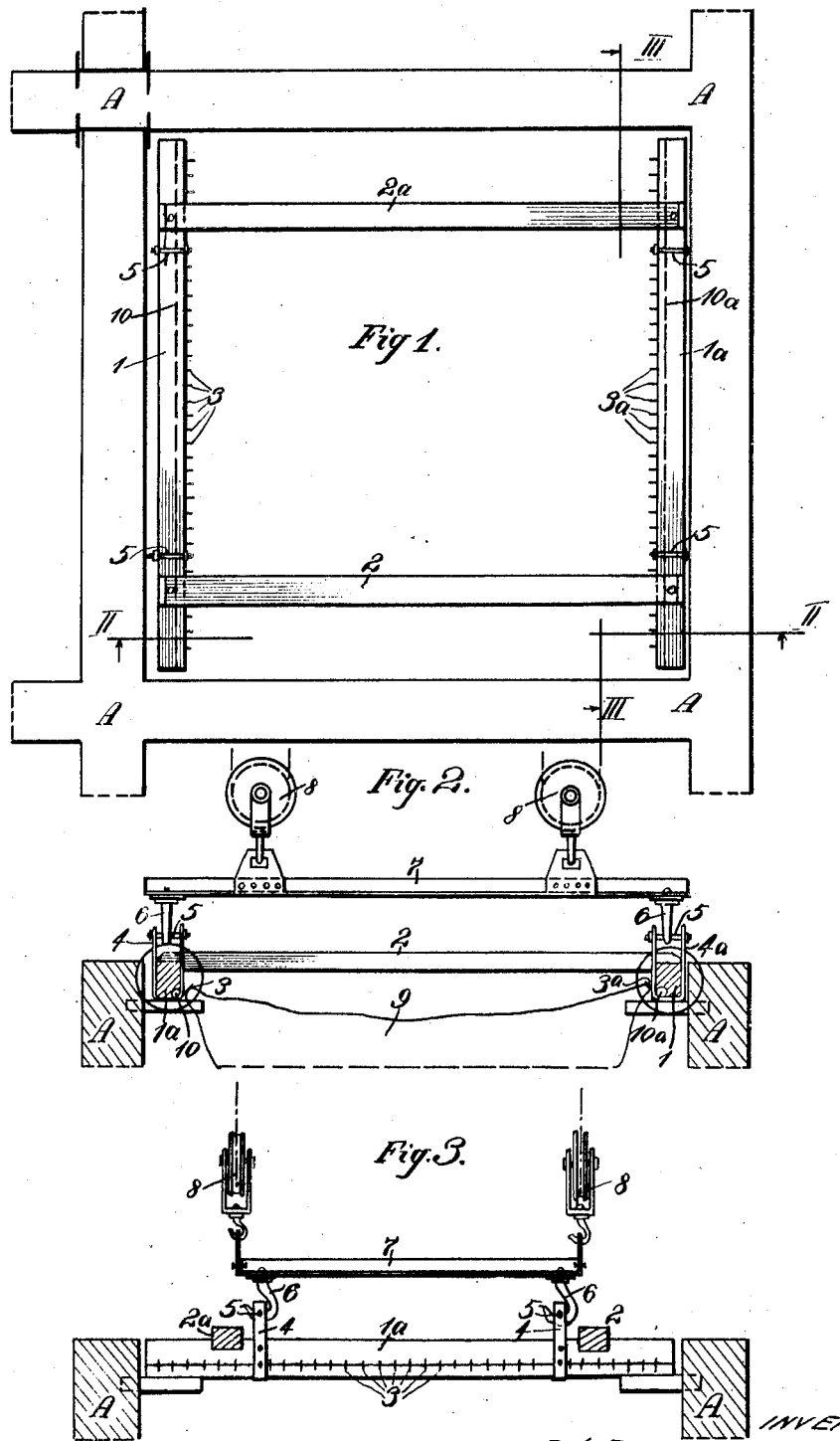

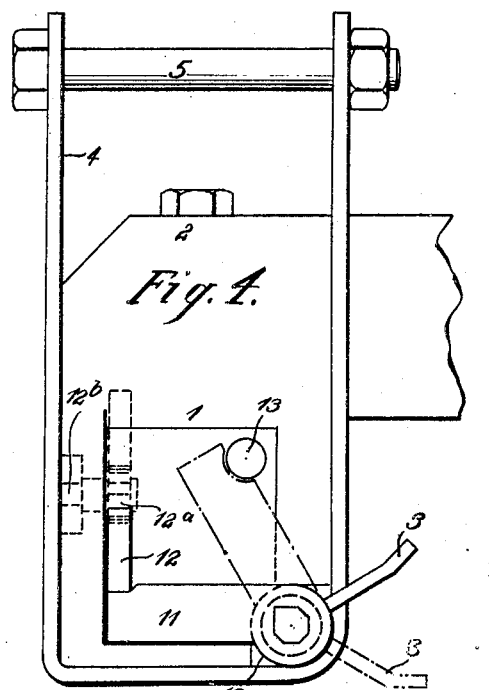
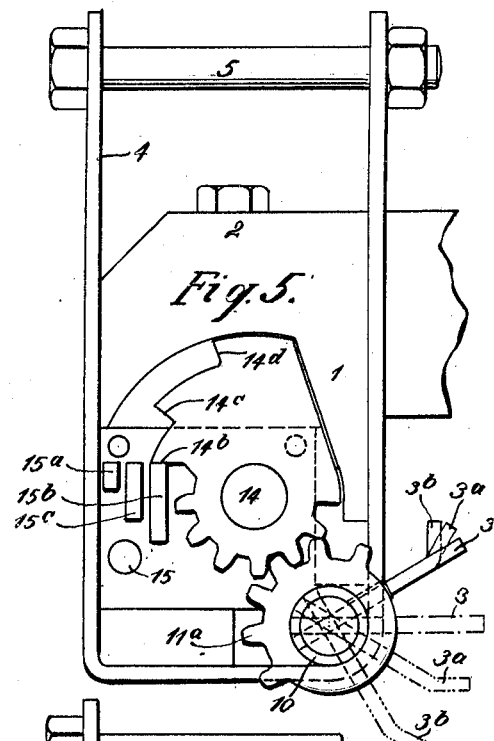
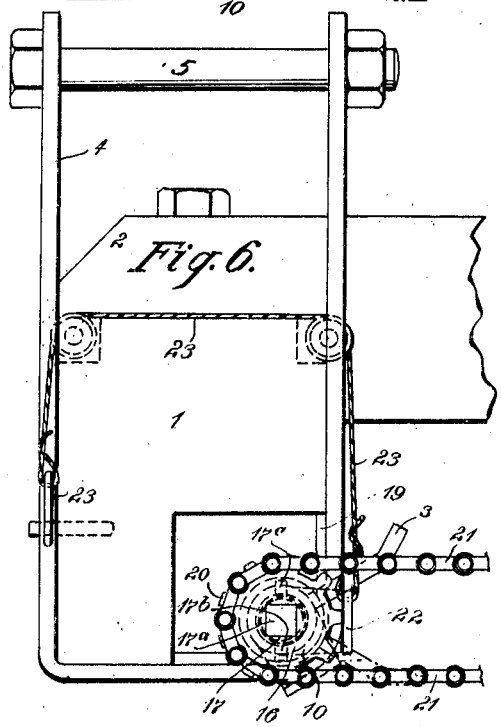
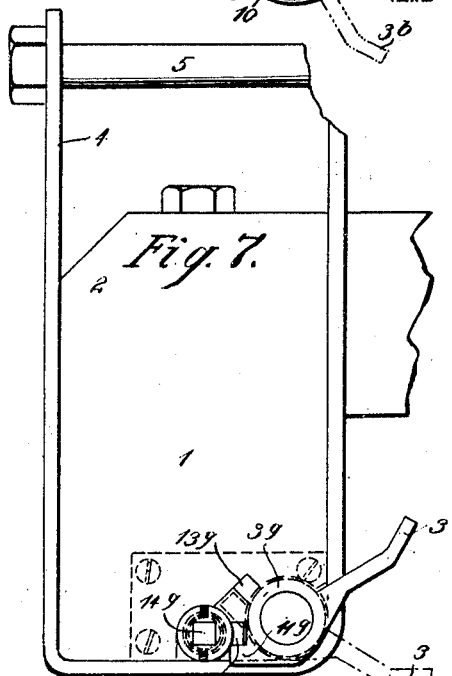

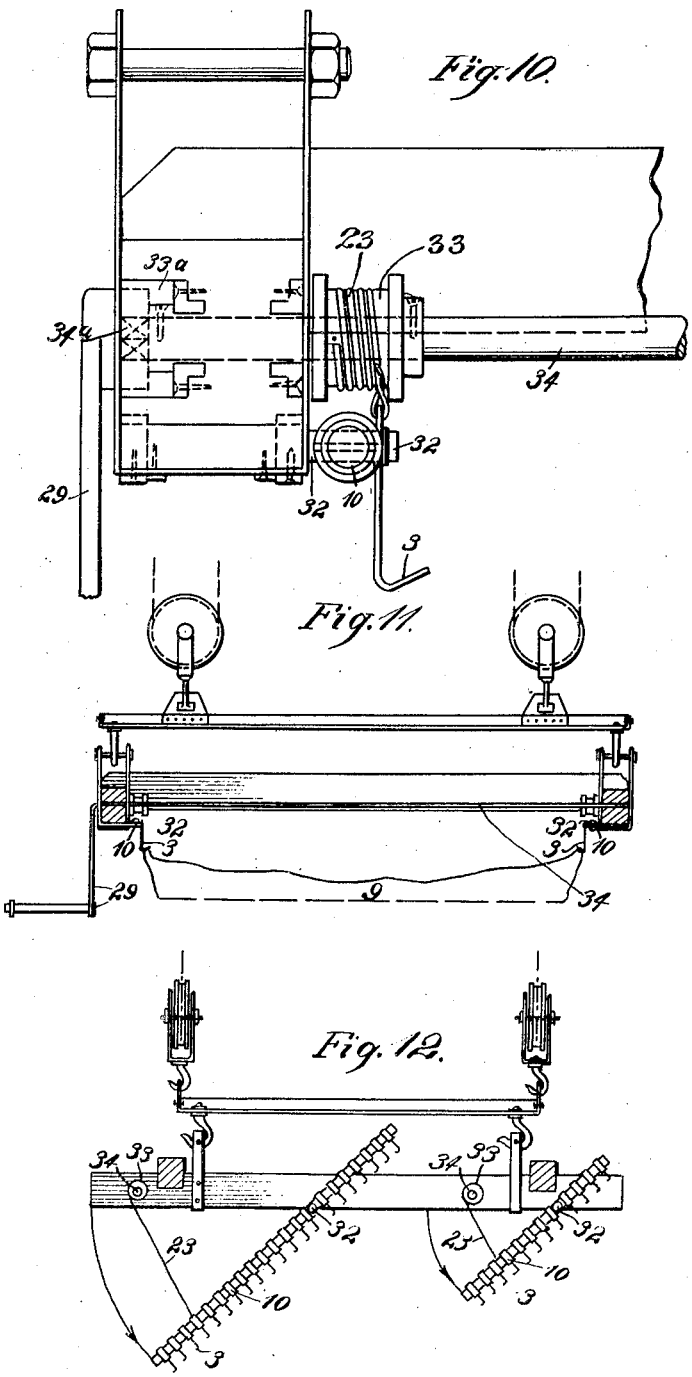

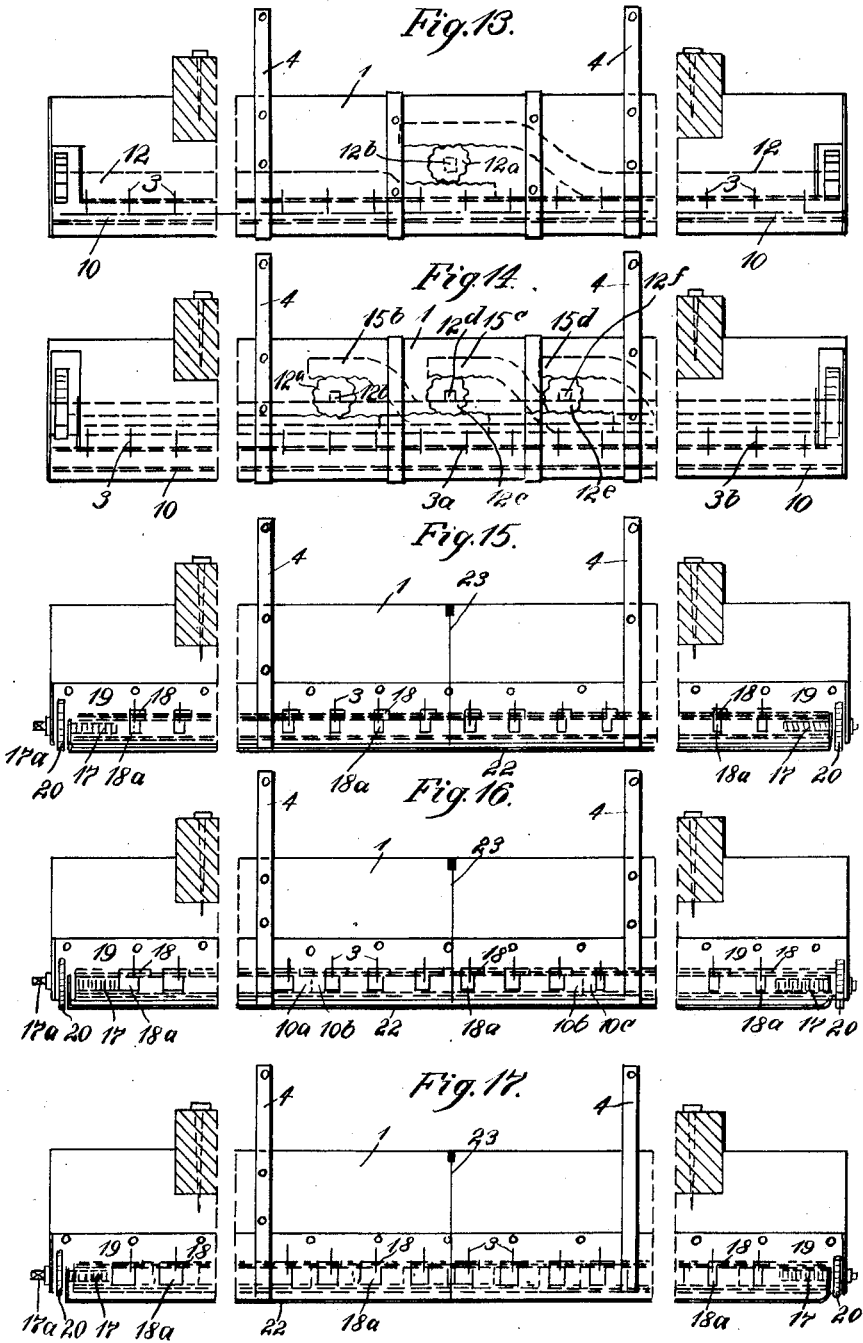

Patented May 28, 1929.

1,715,187

UNITED STATES PATENT OFFICE.

PAUL JULIUS BREITENBACH, OF NEUSTADT IN MECKLENBURG, AND ARTHUR DETLEF JOACHIM VOLLMERT, OF HOCHFELD, NEAR WILSTER, GERMANY.

APPARATUS FOR SUSPENDING SKINS, HIDES, AND THE LIKE.

Application filed July 28, 1926, Serial No. 125,530, and in Germany July 20, 1925.

This invention relates to an apparatus for suspending skins, hides and the like and consisting of pairs of suspending arms or hooks.

An embodiment of the invention is shown, by way of example, in the accompanying drawing in which:—

Fig. 1 shows the device in plan view.
Fig. 2 is a section on line II—II and
Fig. 3 is a longitudinal section on line III—III of Fig. 1.

Figs. 4–12 illustrate seven different arrangements of the hooks, designed for suspending skins, hides or the like, and of the construction and arrangement of said hooks in combination with devices for operating the same, said latter devices being also shown in several forms of construction.

Each of the Figs. 13–17 shows a side elevation of the arrangement of suspension-arms or hooks as shown in Figs. 4–7 and the mechanisms for operating the same.

Figure 18:
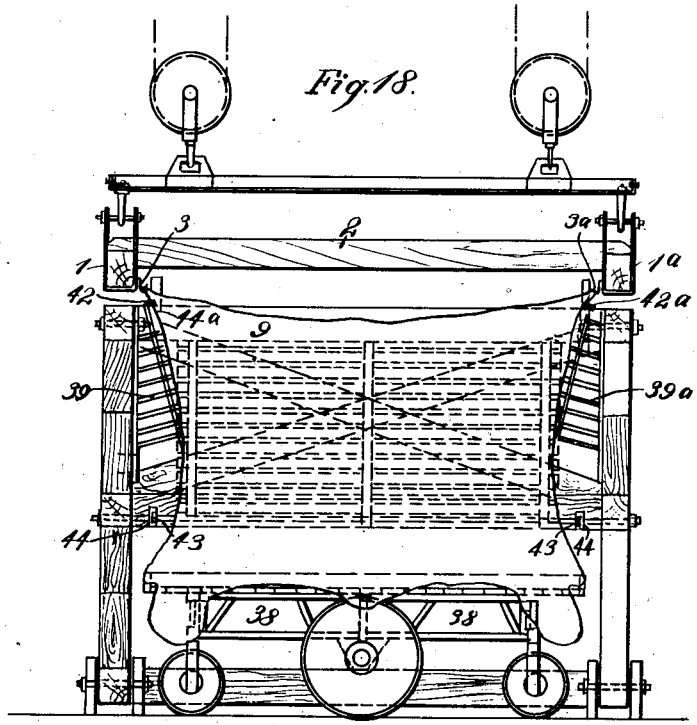

Fig. 18 is a front elevation of an unhooking frame.

Figure 19:
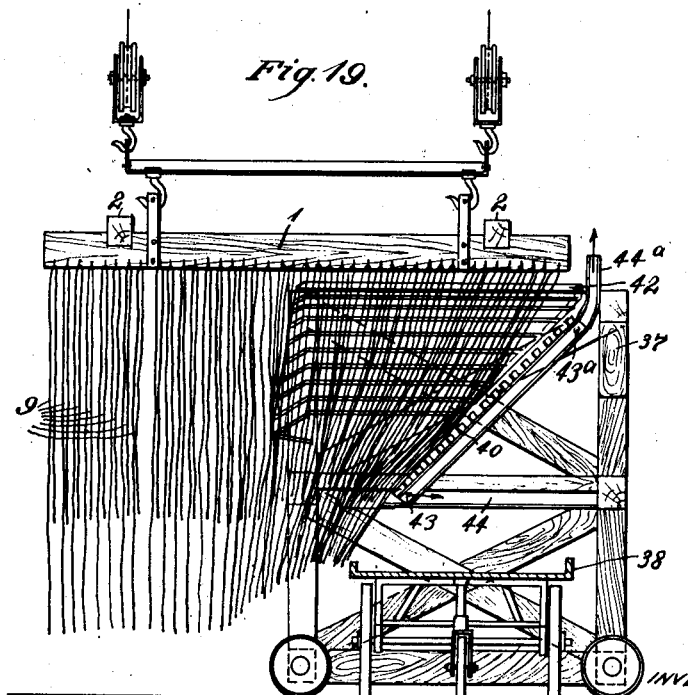

Fig. 19 is a side elevation of the same.

The apparatus, in which the unhooking of the skins, hides or the like from the suspension arms or hooks is effected by mechanical means which are operated in any convenient manner, consists mainly of a frame composed of two long sides 1, 1$^a$ and of two cross sides 2, 2$^a$. The hooks 3, 3$^a$ for suspending the skins, hides and the like are fixed or movably arranged on the long sides 1, 1$^a$ of the frame. The long sides 1, 1$^a$ of the frame have each a bow 4, 4$^a$ the arms of each bow being connected the one with the other by means of a cross bolt 5. These bolts 5 are designed to be hung on hooks 6 of a frame 7 which is suspended on the rope pulleys 8 of a lifting mechanism of well known construction so that the frame can thus be lowered onto or raised from a support A in order to remove the articles i. e. skins 9, hides or the like (Fig. 2) from the suspension frame 1, 1$^a$, 2, 2$^a$. In each of the long sides 1, 1$^a$ of the frame or of the bows 4, 4$^a$ of the same a shaft 10 or 10$^a$ is mounted, said shafts serving for carrying the hooks 3, 3$^a$.

According to the form of construction shown in Fig. 4 each shaft 10 consists of a tube to which the suspension arms or hooks 3 are rigidly fixed, said arms being uniformly spaced the one from the other. On the shaft 10 an arm 11 is further fixed which is adapted to be locked in its position by a locking bolt 12. If the arm 11 is released by the locking bolt, it will rotate under the action of the weight of the skins, hides and the like on the hooks 3 and move from the position shown in Fig. 4 in full lines into the position shown in dot-and-dash lines. In this raised position the arm 11 bears against a stop 13. By this oscillation of the arm 11 the hooks 3 with the skins or the like are lowered into the position shown in dot-and-dash lines. The locking bolt 12 is operated by any convenient means, for instance by a toothed wheel gear 12$^a$, from a handle mounted on the square axle 12$^b$ (see Figs. 4 and 13).

In the form of construction shown in Fig. 5 the arms 3, 3$^a$, 3$^b$ are rigid with the tubular shaft 10. The arms 3, 3$^a$, 3$^b$ are of different shapes so that three groups of arms are formed, the first one comprising straight arms 3, the second group comprising arms 3$^a$, the ends of which are bent at an obtuse angle, and the third group consisting of arms 3$^b$, the ends of which are bent at a less obtuse angle than the arms 3$^a$. A toothed sector 11$^a$ is keyed on shaft 10 and meshes with a sector 14$^a$ keyed on an axle 14, said sector 14$^a$ having, besides the usual teeth, three special teeth 14$^b$, 14$^c$, 14$^d$. For each of the teeth 14$^b$, 14$^c$, 14$^d$ a locking bolt 15$^b$, 15$^c$, 15$^d$, respectively is provided and a stationary stop 15 is further arranged for the tooth 14$^d$. The locking bolt 15$^b$ is designed to hold the tooth 14$^b$ and in this position all the arms 3$^a$, 3$^b$, 3$^c$, are on the same plane. If the locking bolt 15$^b$ is pulled back, for instance by means of the toothed wheel gear 12$^a$ on the shaft 12$^b$ (Fig. 14), the tooth 14$^b$ is released and the sectors 14$^a$ and 11$^a$ are rotated in opposite directions until the tooth 14$^c$ of the sector 14$^a$ comes into contact with the locking bolt 15$^c$. By this part rotation of the sectors the arms 3, 3$^a$, 3$^b$ are brought from the position, shown in full lines, into the position shown in dot-and-dash lines. The articles suspended on the arms 3 can slip off. If the locking bolt 15$^c$ is pulled back, for instance by means of the toothed wheel gear 12$^c$ on the shaft 12$^d$ (Fig. 14) the tooth 14$^c$ is released and the sectors 14$^a$ and 11$^a$ can further rotate until tooth 14$^d$ has come into contact with the locking bolt 15$^d$. The arms 3$^a$ are brought at this occasion from the position shown in lines composed of one point between two dashes into the position shown in lines composed of two points between two dashes so that the articles suspended on the hooks or arms $3^a$ can slip off. If by the locking bolt $15^b$ the tooth $14^d$ is released, for instance, by the operation of the toothed wheel gear $12^e$ on the shaft $12^f$ (Fig. 14) the toothed sectors $14^a$ and $11^a$ execute a further part rotation until the tooth $14^d$ comes into contact with the stop 15. The arms or hooks $3^b$ assume then the position shown in lines composed of three dots between two dashes so that the articles on the hooks or arms $3^b$ can slip off.

In the form of construction shown in Fig. 6 a tube 16 is located in the tubular shaft 10. This tube 16 has at its two ends an inner thread designed to receive the external threads in the ends of a rod 17 which has at one of its ends a square portion $17^a$ designed to receive a handle. The tube 16 is secured in the tubular shaft 10 against displacement in longitudinal direction by means of studs $17^b$, $17^c$. The arms or hooks 3 are rigid with the tubular shaft 10 and project through angular slots 18, $18^a$ of a wall 19 arranged in front of the tubular shaft 10 (Figs. 15, 16, 17). On the two ends of the rod 17 situated in tube 16 sprocket wheels 20 are keyed which are connected with similar sprocket wheels on an opposite rod by means of chains 21. On the rod 17 a bow 22 is further suspended the web of which is slightly longer than the tubular shaft 10 and tube 16. To this bow 22 a rope 23 is attached by means of which the arms or hooks 3 are to be raised from the lowered position to the lifted position (compare the positions shown in Fig. 6 in dash and dot lines and the position shown in full lines). The portions 18 of the slots 18, $18^a$ in the wall 19 are either of the same or of different lengths and the portions $18^a$ of said slots are either of the same or of different widths, (see Figs. 15, 16, 17). The shape of the slots 18, $18^a$ serves to make the arms or hooks 3 drop either simultaneously or successively at the shifting of the telescoped tubular shaft 10 and tube 16, due to the rotation of rod 17.

In the position of use the arms or hooks 3 rest upon the lower edges of the portions 18 of the slots. If the tubular shaft 10 and tube 16 are shifted the arms drop into the portions $18^a$ of the slots. The tubular shaft 10 and the tube 16, which are telescoped the one in the other, may be composed of three elements, for instance $10^a$, $10^b$, $10^c$ Fig. 16, so that groups of hooks are formed. For each of said groups a similar number of slots 18, $18^a$ is provided so that, at the shifting of the tubular shaft 10 and tube 16, the different groups of hooks 3 are successively released and dropped. If it is desirable to make the arms or hooks 3 drop singly, the tubular shaft 10 and tube 16 must be composed each of so many separate elements as there are hooks 3 (Fig. 17). In the form of construction shown in Fig. 7 the arms or hooks 3 are loosely mounted by means of eyes $3^g$ on a stationary shaft $10^g$. The eyes $3^g$ have studs $11^g$ which bear against studs $12^g$ mounted on a square shaft $14^g$ constructed and arranged in such a manner that it can be shifted in axial direction to bring the studs $12^g$ away from the studs $11^g$ and to release the arms 3 in order that they can move from the position shown in full lines into the position shown in dot-and-dash lines (Fig. 7). The stud $11^g$ strikes against a stop $13^g$.

In the form of construction shown in Fig. 8 the hooks 3 are loosely mounted on a rotatable shaft 10, spaced at uniform distances. On the ends of shaft 10, which is secured against displacement in longitudinal direction, bevel gears 25 or the like are keyed which mesh with bevel gears 26 on a shaft 27 which connects the two long sides 1, $1^a$ of the supporting frame. By means of a handle mounted on the square end $27^a$ of shaft 27 the shafts 10, 27 are rotated. The portions of shaft 10 near each end of the same are threaded and a bush 28 having internal threads and being secured against rotation is axially displaced on shaft 10 at the rotation of the shaft 27 and moves the hooks 3 until they slip off supports arranged in the front partition 19 and drop.

As shown in Fig. 9 the hooks 3 are each bent around the tubular shaft 10 and riveted on the same. The two tubular shafts 10 are mounted underneath the long sides 1, $1^a$ of the frame in bows 24 or the like. One of the tubular shafts 10 has a square end $17^a$ designed to receive a crank handle 29. The tubular shafts 10 have further arms 30 which are connected the one with the other by a rod 31 so that, if the one tubular shaft 10 is rotated in the one direction the other tubular shaft is rotated in the same direction and the hooks $3^a$ swing in outward direction until the bent portions of the same are in the horizontal or approximately horizontal position and the articles suspended on the same, skins, hides or the like, can slide off the hooks.

The hooks may also be fixed in the long sides 1, $1^a$ of the carrying frame and the tubes 10, $10^a$ may have forks which are raised when the tubes 10, $10^a$ are rotated and grip under the articles to lift the same off the hooks 3, $3^a$.

In the form of construction, shown in Figs. 10 to 12 the hooks are rigid with the tube 10. Each tube 10, 10 is journaled by means of a transverse journal 32 in the long side 1 or $1^a$ of the carrying frame so that it can be rotated (Fig. 12) with the aid of any convenient means. Pull ropes 23 may for instance be used which are attached to the tubes 10, $10^a$ and wound around drums 33 keyed on shafts 34 adapted to be rotated by means of crank handles 29 placed on square ends $34^a$ of said shafts. If the tubes 10, $10^a$ are in the position shown in Fig. 12 the curved portions of the hooks stand horizontally or almost horizontally so that in this position the articles, skins, hides or the like can slip off the hooks.

In the form of construction shown in Figs. 18 and 19 the suspending means are not provided for each single frame but independent from the frames.

The suspension hooks 3, 3ª are fixed in the long sides 1, 1ª of the frame. After the steeping in lime, the dressing or tanning having been terminated the suspension frame 1, 1ª, 2, 2ª with the skins, hides or the like hanging on the hooks is brought over an unhooking frame 37 in which a truck 38 stands. When the frame 1, 1ª, 2, 2 is being conveyed into the frame 37 the hides 9 are brought into an inclined position (Figs. 18 and 19) by means of lateral longitudinal grates 39, 39ª and an inclined transverse grate 40. The frame 1, 1ª, 2, 2 is then lowered and at this occasion bars 42, 42ª arranged above the longitudinal grates 39, 39ª strike against the skins, hides and the like, the curved portions of the hooks moving along the bars 42, 42ª wherefrom results that the articles are stripped off the hooks. Simultaneously with the stripping off of the skins, hides or the like the grate 40 is brought from its inclined position into the vertical position, its studs 43 and 43 moving in suitably arranged guides 44, 44. The skins, hides or the like drop upon the truck 38 in the succession in which they are unhooked from the hooks 3, 3ª.

We claim:—

In an apparatus for suspending hides, skins and the like, a frame, a series of hooks mounted thereon for swinging movement from a hide holding position to a hide discharging position, and means for mechanically controlling the hooks to arrange them in either position.

In testimony whereof we affix our signatures.

PAUL JULIUS BREITENBACH.
ARTHUR DETLEF JOACHIM VOLLMERT.